(12) United States Patent
Grisenthwaite

(10) Patent No.: US 8,296,538 B2
(45) Date of Patent: Oct. 23, 2012

(54) STORING SECURE MODE PAGE TABLE DATA IN SECURE AND NON-SECURE REGIONS OF MEMORY

(75) Inventor: Richard Roy Grisenthwaite, Cambridgeshire (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 12/929,766

(22) Filed: Feb. 14, 2011

(65) Prior Publication Data

US 2011/0208935 A1  Aug. 25, 2011

Related U.S. Application Data

(63) Continuation-in-part of application No. 12/656,849, filed on Feb. 17, 2010.

(51) Int. Cl.
G06F 12/10 (2006.01)
(52) U.S. Cl. ........................................ 711/163; 711/206
(58) Field of Classification Search ........................ None
See application file for complete search history.

(56) References Cited

U.S. PATENT DOCUMENTS

| | | | |
|---|---|---|---|
| 7,130,977 B1 * | 10/2006 | Christie et al. | 711/163 |
| 2005/0050295 A1 * | 3/2005 | Noel et al. | 711/206 |
| 2005/0268095 A1 * | 12/2005 | O'Connor | 713/167 |
| 2009/0182976 A1 * | 7/2009 | Agesen | 711/207 |
| 2011/0173409 A1 * | 7/2011 | Sibert | 711/163 |

OTHER PUBLICATIONS

International Search Report and Written Opinion of the International Searching Authority dated Oct. 19, 2011 in PCT/GB2011/050270.
U.S. Appl. No. 12/656,849, filed Feb. 17, 2010, Grisenthwaite.
Invitation to Pay Additional Feels and Annex Communication Relating to the Results of the Partial International Search mailed May 18, 2011 in PCT/GB2011/050270.
Office Action mailed Feb. 7, 2012 in co-pending U.S. Appl. No. 12/656,849.

* cited by examiner

*Primary Examiner* — Kaushikkumar Patel
(74) *Attorney, Agent, or Firm* — Nixon & Vanderhye, P.C.

(57) ABSTRACT

Apparatus for data processing 2 is provided with processing circuitry 8 which operates in one or more secure modes 40 and one or more non-secure modes 42. When operating in a non-secure mode, one or more regions of the memory are inaccessible. A memory management unit 24 is responsive to page table data to manage accesses to the memory which includes a secure memory 22 and a non-secure memory 6. Secure mode page table data 36, 38 is used when operating in one of the secure modes. A page table entry within the hierarchy of page tables of the secure mode page table data includes a table security field 68, 72 indicating whether or not a further page table pointed to by that page table entry is stored within the secure memory 22 or the non-secure memory 6. If any of the page tables associated with a memory access are stored within the non-secure memory 6, then the memory access is marked with a table attribute bit NST indicating that the memory access should be treated as non-secure.

19 Claims, 8 Drawing Sheets

STORING SECURE MODE PAGE TABLE DATA IN SECURE AND NON-SECURE REGIONS OF MEMORY

This application is a continuation-in-part of U.S. application Ser. No. 12/656,849, filed Feb. 17, 2010, the entire contents of which is hereby incorporated by reference.

BACKGROUND OF THE INVENTION

1. Field of the Invention

This invention relates to data processing systems. More particularly, this invention relates to data processing systems having one or more secure modes of operation and one or more non-secure modes of operation and that utilise secure mode page table data for managing accesses to memory when operating in a secure mode.

2. Description of the Prior Art

It is known to provide data processing systems, such as data processing systems incorporating the TrustZone architecture of ARM Limited, Cambridge, England, that have one or more secure modes of operation and one or more non-secure modes of operation. The memory (memory address space) within such systems is typically provided with one or more secure regions that are accessible in a secure mode of operation and are inaccessible in a non-secure mode of operation together with one or more non-secure regions that are accessible both in a secure mode of operation and in a non-secure mode of operation. In this way, sensitive data, such as encryption keys, financial data etc, may be stored within the secure regions and only accessible to trusted/secure applications which execute in a secure mode of operation. Such data processing systems also support non-secure applications which execute in a non-secure mode, but which only have access to the non-secure regions of memory. Such systems are, for example, useful in digital rights management in which highly sensitive and secret information such as encryption keys may be secured within a secure region of memory and only accessible to secure applications executing in a secure mode while the system also supports non-secure applications, such as media players or unrelated applications, that execute in a non-secure mode and utilise the non-secure regions of memory without needing themselves directly to access the secure/secret data held within the secure regions of memory.

In order to manage access to the secure regions of memory when operating in the one or more secure modes, it is known to provide secure mode page table data which is used by memory management circuitry, such as a memory management unit or a memory protection unit, to control/manage access to the memory. A memory management unit may, for example, be responsible for translating virtual addresses generated in a secure mode into physical addresses. The regions within the memory to be accessed in the secure mode may include both secure regions and non-secure regions. A problem that may arise is that secure mode page table data used to manage accesses to secure regions of memory may be subject to unauthorised alteration such that, for example, an application in a secure mode accesses a non-secure region of memory rather than a secure region of memory as was initially intended. This can compromise the security of the system.

In order to deal with this problem it is possible to store all of the secure mode page table data within secure regions of the memory. In this way, the secure mode page table data can be protected from unauthorised alteration seeking to circumvent the security of the system. However, a problem with this approach is that the size of the secure mode page table data is large and consumes a disadvantageously large amount of memory capacity of the one or more secure regions of the memory. Thus, the secure regions of memory may be required to have a large storage capacity just to store the secure mode page table data even though the amount of secure data itself, e.g. encryption keys, financial data, secure program instruction code etc, is relatively small in quantity.

SUMMARY OF THE INVENTION

Viewed from one aspect the present invention provides apparatus for processing data, said apparatus comprising:
a memory;
processing circuitry responsive to a stream of program instructions to perform processing operations, said processing circuitry having a plurality of modes of operation including one or more secure modes and one or more non-secure modes, said memory including:
(i) one or more secure regions accessible in said one or more secure modes and inaccessible in said one or more non-secure modes; and
(ii) one or more non-secure regions accessible in said one or more secure modes and accessible in said one or more non-secure modes;
memory control circuitry responsive to page table data to manage access to said memory; wherein
said page table data includes secure mode page table data used to manage access to said memory when said processing circuitry is operating in said one or more secure modes and non-secure mode page table data used to manage access to said memory when said processing circuitry is operating in said one or more non-secure modes;
said secure mode page table data includes a hierarchy of page tables with associated page table levels configured such that a first-level page table at a first page table level contains page table entries pointing to respective second-level page tables at a second page table level lower in said hierarchy than said first page table level; and
each page table entry of said first-level page table includes a table security field indicating whether a second-level page table pointed to by said page table entry is stored within said one or more secure regions or within said one or more non-secure regions.

The present invention recognises that while the one or more secure modes of operation may require their own secure mode page table data, not all of this secure mode page table data relates to regions of the memory which are secure regions of the memory and/or are storing sensitive/secret data. Accordingly, it is possible that not all of the secure mode page table data need be stored within secure regions of the memory. The portion of the secure mode page table data which is used to manage accesses to secure regions of the memory may be stored within secure regions of the memory whereas the portion of the secure mode page table data which is used to manage accesses to non-secure regions of the memory may be stored within non-secure regions of the memory. In order to support and manage this division of the secure mode page table data between secure regions and non-secure regions of the memory, each page table entry within a page table of at least some of the levels of page table includes a table security field indicating whether or not a further page table pointed to by that entry is stored within a secure region or a non-secure region of the memory. Thus, as the hierarchical secure mode page table data is accessed by the memory control circuitry (such as a memory management unit or a memory protection unit), a determination may be made as to whether any of the secure mode page table data used in that access is stored within a non-secure region of the memory. It will be appreciated that the first-level page table and the second-level page table referred to over, need not be any particular position within the page table hierarchy and in particular need not be a level 1 or a level 2 page table.

In some embodiments of the invention, the memory control circuitry is configured to perform a page table walk operation in which a sequence of page table entries descending through page table levels in the hierarchy are accessed to retrieve attribute data of a memory access operation to be managed. If during this page table walk any of the sequence of page table entries accessed has a value of the table security field indicating that one of the sequence of page table entries being accessed is stored within a non-secure region of the memory, then the memory control circuitry may respond by identifying that memory access operation being performed as a non-secure memory access operation. In order to safeguard security, if any of the page table data involved in a memory access operation when operating in a secure mode is stored within non-secure regions of the memory, then the memory access operation concerned will be treated as a non-secure memory access operation even if it has been initiated by a program executing in a secure mode.

In some embodiments the memory control circuitry may identify a memory access operation as a non-secure memory access operation by including a non-secure table attribute within the attribute data associated with the memory access operation. This non-secure table attribute may be separate from a different attribute that indicates that the memory access has originated from an operation within a secure mode. The non-secure table attribute indicates that a page table stored in non-secure memory has been used in managing that memory access operation.

When a memory access operation is identified as a non-secure memory access operation by the memory control circuitry and the memory access operation is directed to one or more secure regions of the memory, then the memory may respond by blocking that memory access operation. If the memory access operation is non-secure, e.g. a page table entry stored in non-secure memory has been used as part of the management of that memory access operation, then it is unsafe for the memory to permit access to a secure region of the memory.

The processing circuitry may execute a plurality of software processes. Each of these software processes may utilise its own page table data. Alternatively, some page table data may be applied to multiple processes and may be identified by a global attribute as being for use in memory accesses from any of those multiple software processes. Other attribute data may be non-global and used for memory accesses from only individual software processes connected to that non-global attribute data.

In the context of systems supporting both global and non-global attribute data, the memory management circuitry may be configured to force attribute data to be treated as non-global attribute data if any of a sequence of page table entries accessed as part of a page table walk associated with that memory access is stored within a non-secure region of the memory. Thus, if any of the page tables associated with the memory access are stored within non-secure regions of the memory, then the memory control circuitry overrides any information within the page table data indicating otherwise and forces the attribute data concerned to be non-global attribute data. Permitting global attribute data generated from a page table walk that involves non-secure regions of the memory would permit a security vulnerability in the system.

It will be appreciated that the attribute data can take a variety of different forms, e.g. attribute data could indicate which privileged levels of operation are permitted access to associated data (memory page), whether or not that associated data is read-only, whether or not that associated data is cacheable and the like. Such a use could be in the context of a memory protection unit (MPU) where no address translation is performed. The present technique is particularly useful when the attribute data provides a mapping between a virtual memory address of a memory access operation and a physical memory address within the memory corresponding to that memory access operation. Protecting such mappings is important in preserving security.

The present technique may be used in embodiments in which the storage capacity of the one or more secure regions is less than the storage capacity of the one or more non-secure regions. This is particularly the case when the one or more non-secure regions are formed within an integrated circuit separate from the integrated circuit in which the processing circuitry, the memory control circuitry and the one or more secure regions are formed.

Embodiments of the invention may also provide a secure translation table base register configured to store a base address value pointing to an entry point of the hierarchy of the secure mode page table data. Such a secure translation table base register may include a security field indicating whether all of the secure mode page table data is stored in one or more non-secure regions.

Viewed from another aspect the present invention provides apparatus for processing data, said apparatus comprising:
  memory means for storing data;
  processing means for performing processing operations in response to a stream of program instructions, said processing means having a plurality of modes of operation including one or more secure modes and one or more non-secure modes, said memory means including:
    (i) one or more secure regions accessible in said one or more secure modes and inaccessible in said one or more non-secure modes; and
    (ii) one or more non-secure regions accessible in said one or more secure modes and accessible in said one or more non-secure modes;
  memory control means for managing access to said memory means in response to page table data; wherein
    said page table data includes secure mode page table data used to manage access to said memory means when said processing means is operating in said one or more secure modes and non-secure mode page table data used to manage access to said memory means when said processing means is operating in said one or more non-secure modes;
    said secure mode page table data includes a hierarchy of page tables with associated page table levels configured such that a first-level page table at a first page table level contains page table entries pointing to respective second-level page tables at a second page table level lower in said hierarchy than said first page table level; and
    each page table entry of said first-level page table includes a table security field indicating whether a second-level page table pointed to by said page table entry is stored within said one or more secure regions or within said one or more non-secure regions.

Viewed from a further aspect the present invention provides a method of managing access to a memory associated with processing circuitry having a plurality of modes of operation including one or more secure modes and one or more non-secure modes, said memory including one or more secure regions accessible in said one or more secure modes and inaccessible in said one or more non-secure modes and one or more non-secure regions accessible in said one or more secure modes and accessible in said one or more non-secure modes, said method comprising the steps of:

in response to secure mode page table data, managing access to said memory when said processing circuitry is operating in said one or more secure modes; and in response to non-secure mode page table data, managing access to said memory when said processing circuitry is operating in said one or more non-secure modes; wherein said secure mode page table data includes a hierarchy of page tables with associated page table levels configured such that a first-level page table at a first page table level contains page table entries pointing to respective second-level page tables at a second page table level lower in said hierarchy than said first page table level; and each page table entry of said first-level page table includes a table security field indicating whether a second-level page table pointed to by said page table entry is stored within said one or more secure regions or within said one or more non-secure regions.

Viewed from a further aspect the invention provides apparatus for processing data, said apparatus comprising:

a memory;

processing circuitry responsive to program instructions to perform processing operations, said processing circuitry having a plurality of modes of operation including one or more secure modes and one or more non-secure modes, said memory including:

(i) one or more secure regions accessible in said one or more secure modes and inaccessible in said one or more non-secure modes; and (ii) one or more non-secure regions accessible in said one or more secure modes and accessible in said one or more non-secure modes;

memory control circuitry responsive to page table data to manage access to said memory; wherein said memory control circuitry is configured such that when operating in one of said one or more secure modes and said memory control circuitry receives a signal indicating that page table data stored within said one or more non-secure regions has been used to manage access for a memory access request operating in one of said one or more secure modes, then said memory control circuitry handles said memory access as if said memory access had arisen when operating in one of said one or more non-secure modes.

The above, and other objects, features and advantages of this invention will be apparent from the following detailed description of illustrative embodiments which is to be read in connection with the accompanying drawings.

DESCRIPTION OF EMBODIMENTS

Figure 1:
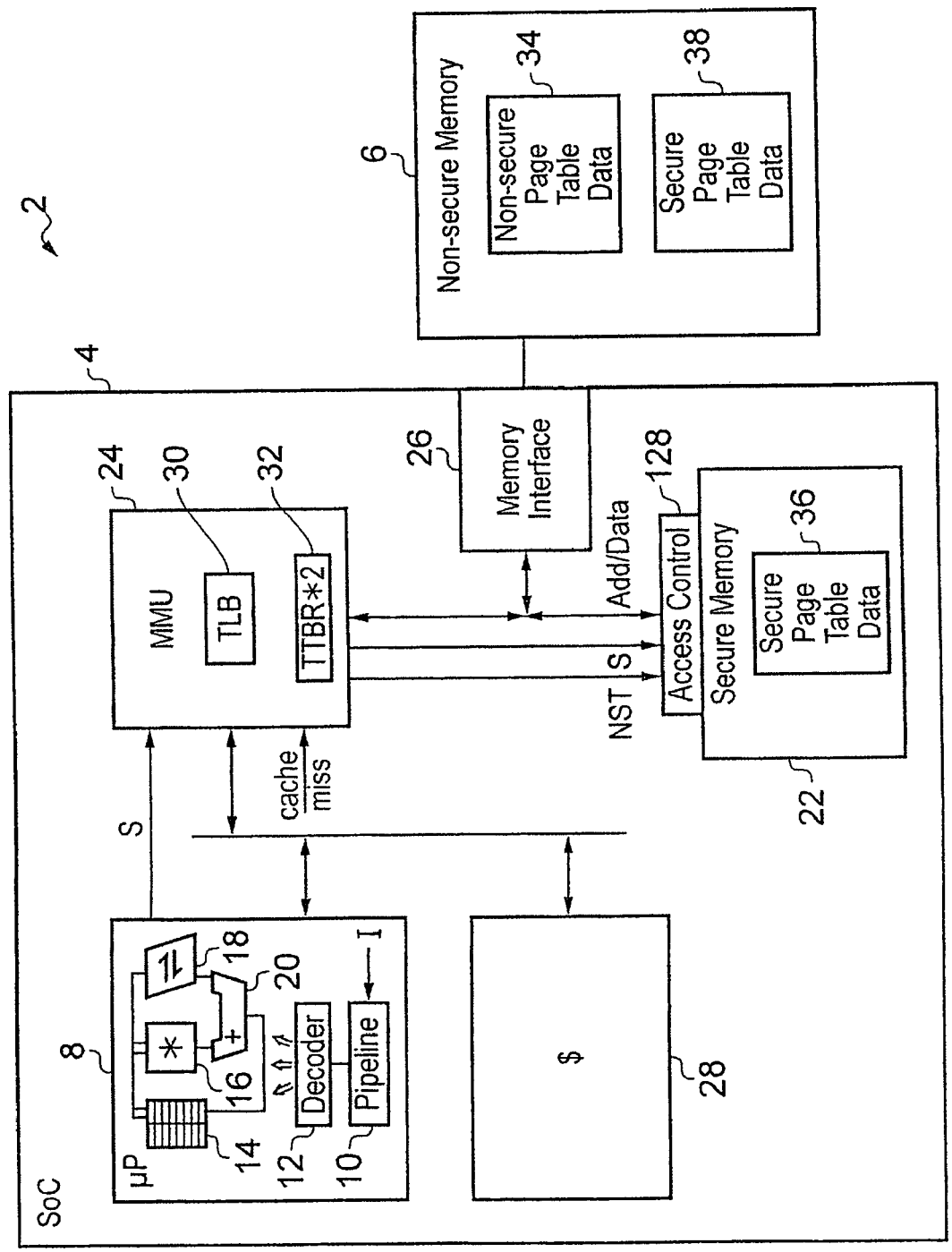
FIG. 1 schematically illustrates a data processing system incorporating processing circuitry, memory management circuitry and a memory including both secure regions and non-secure regions.

FIG. 1 schematically illustrates a data processing system 2 incorporating a system-on-chip integrated circuit 4 and a separate non-secure memory integrated circuit 6. The system-on-chip integrated circuit 4 includes processing circuitry in the form of a processor 8 which is responsive to program instructions I received in an instruction pipeline 10 to control an instruction decoder 12 to generate control signals that configure and control a data path including a register bank 14, a multiplier 16, a shifter 18 and an adder 20. The processor 8 performs data processing operations under control of the program instructions I. These data processing operations include memory access operations seeking to read or write data from or to memory addresses within the memory address space of the system. Not all of the memory address space may be associated with actual physical memory capable of storing data values, e.g. some may be unavailable for use. Part of the memory address space corresponds to a secure memory 22 provided within the system-on-chip integrated circuit 4. Part of the memory address space corresponds to the non-secure memory 6. Thus, the secure memory 22 provides one or more secure regions of memory and the non-secure memory 6 provides one or more non-secure regions of memory. Also provided within the system-on-chip integrated circuit 4 are a memory management unit 24 (a form of memory control circuitry), an external memory interface 26 and a cache memory 28.

The processor 8 generates memory accesses using virtual addresses. The cache memory 28 stores cached data values (which may be both data and instructions) using these virtual addresses. If a cache miss occurs, then the data value to be accessed must be read from one of the secure memory 22 or the non-secure memory 6. The memory management unit 24 performs a conversion of the virtual address to a physical address as the secure memory 22 and the non-secure memory 6 are both physically addressed devices. The memory management unit 24 includes a translation lookaside buffer 30 which includes attribute data of recently accessed pages of memory. If the virtual address being accessed does not correspond to one of the entries within the translation lookaside buffer 30, then a full access to the page table data needs to be performed, i.e. a page table walk.

The processor 8 is operable in one or more secure modes and one or more non-secure modes. When operating in a secure mode, then this is indicated by a secure mode signal S supplied from the processor 8 to the memory management unit 24. There are two sets of page table data provided. Secure mode page table data is used when operating in one of the secure modes. Non-secure mode page table data is used when operating in one of the non-secure modes. Two translation table base registers 32 are provided within the memory management unit 24 and respectively provide pointers to the start of the secure mode page table data and the start of the non-secure mode page table data. A page table walk is performed by reading the relevant translation table base register value to find the start address of the appropriate set of page table data and then accessing this page table data using its hierarchical form in a manner conventionally referred to as a page table walk. Such a page table walk will be discussed and described further below.

It will be seen from FIG. 1 that the non-secure mode page table data 34 is all stored within the non-secure memory 6. The secure mode page table data is stored in two parts. A first part of the secure mode page table data 36 is stored within the secure memory 22 and a second part of the secure mode page table data 38 is stored within the non-secure memory 6. The ability to store the second part of the secure mode page table data 38 within the non-secure memory 6 saves storage capacity of the secure memory 22 to be used for other purposes and enables the on-chip secure memory 22 to be smaller while the overall system still has a full set of secure mode page table data stored both within the secure memory 22 and the non-secure memory 6.

The first part of the secure mode page table data 36 stored within the secure memory 22 will normally be the page table data which relates to regions of the memory which store security sensitive data that is properly reserved for access only by programs executing within one of the secure modes. The second part of the secure mode page table data 38 relates to regions of the memory which while accessed when operating in a secure mode are not storing sensitive data and where a security vulnerability is not provided by permitting this second part of the secure mode page table data 38 to be stored within the non-secure memory 6.

Figure 2:
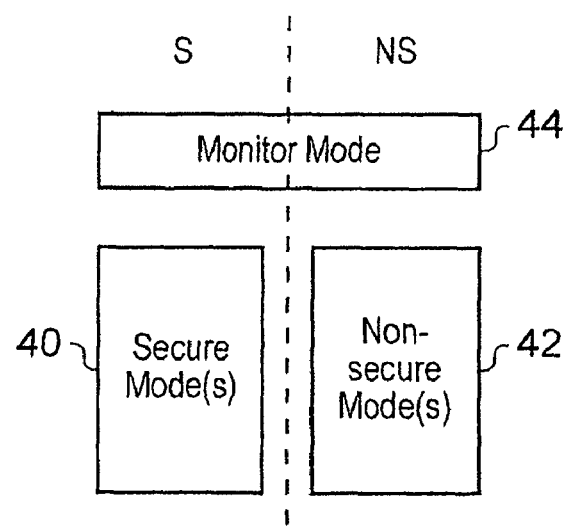
FIG. 2 schematically illustrates operating modes of the processing circuitry of FIG. 1 including one or more secure modes and one or more non-secure modes.

FIG. 2 schematically illustrates modes of operation of the processor 8 of FIG. 1. These modes include one or more secure modes 40, one or more non-secure modes 42 and a monitor mode 44 provided to permit transitions between one of the secure modes 40 and one of the non-secure modes 42. It will be appreciated by those in this technical field that the one or more secure modes may include modes relating to different levels of privilege, but all being secure modes, e.g. a secure user mode and a secure privileged mode. In a similar way, modes of different level of privilege may be provided within the non-secure modes 42, e.g. a non-secure user mode and a non-secure privileged mode. When operating in a secure mode the processor 8 utilises the secure mode page table data to manage its memory accesses. When operating in a non-secure mode the processor 8 uses the non-secure mode page table data to manage its memory accesses. The monitor mode 44 uses the secure mode page table data. These modes of operation are hardware modes as the hardware within the data processing system 2 provides different levels of access to resources, e.g. memory regions, control registers etc depending upon the current mode of operation.

Figure 3:
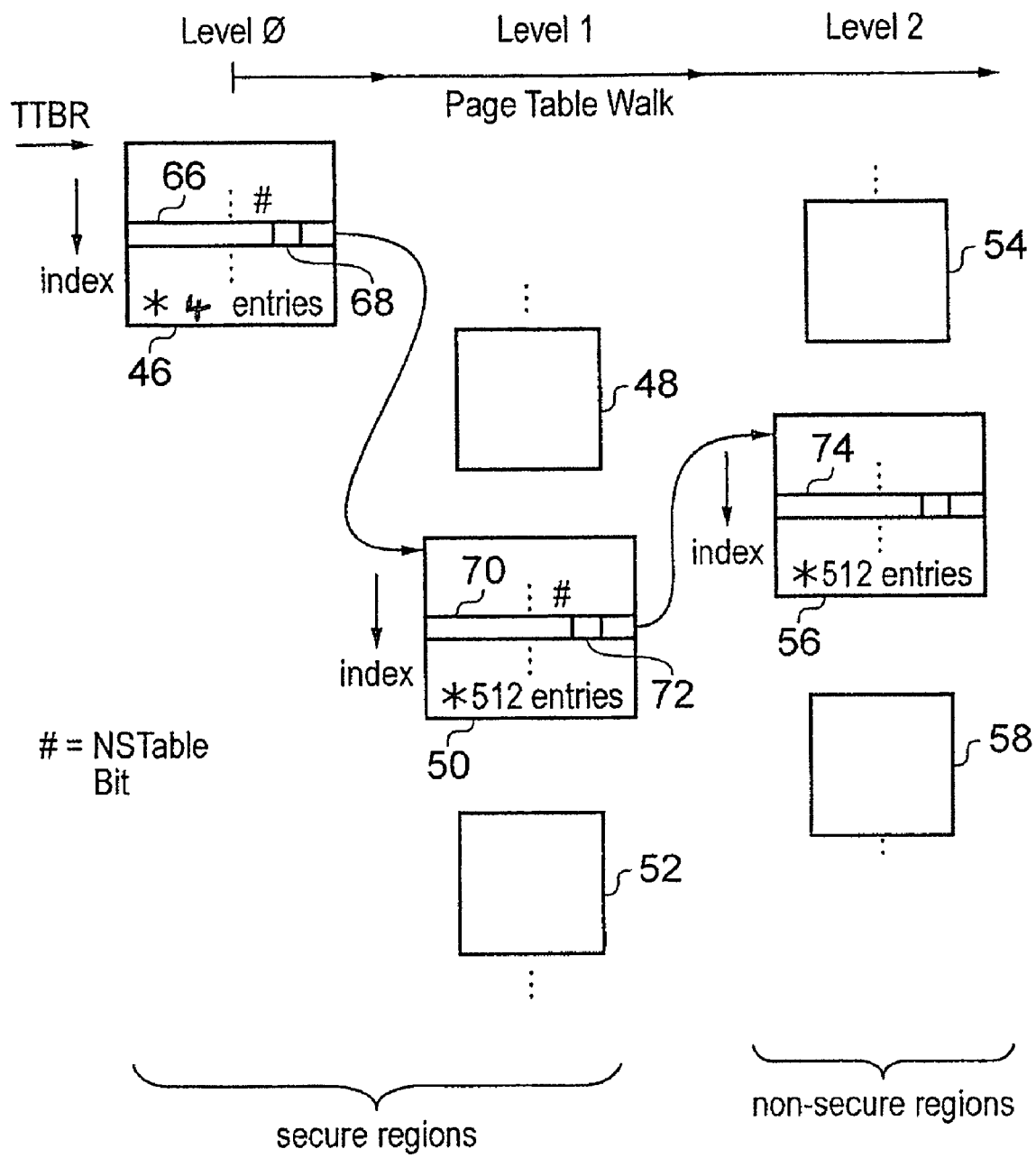
FIG. 3 schematically illustrates a page table walk through secure mode page table data to retrieve attribute data for managing a memory access when operating in a secure mode.

FIG. 3 schematically illustrates a page table walk operation through secure mode page table data. The secure mode page table data is formed of a plurality of page tables 46, 48, 50, 52, 54, 56, 58 arranged in a hierarchy of levels. At the highest level in the hierarchy there is page table 46 containing four entries. This is Level 0. Each of the page tables 48 to 58 comprises 512 page table entries. Each page table 48 to 58 is conventionally 4 kB in size, i.e. each page table entry is 64-bits.

The translation table base register 32 applicable in a secure mode points to the start address of the page table 46. A field of bits within the virtual address for which a memory access is being managed are then used to provide an index value to select one of the page table entries 66 within the page table 46. As an example, the most significant 2 bits of the virtual address VA[31:30] provide an index to identify one of the four page table entries within page table 46. This page table entry 66 contains a 20-bit field (NextTablePtr<31:12>) that is combined with the next 9 bits of the virtual address VA[29:21] to provide a pointer to the next page table entry 70 within the level 1 table (the least significant bits are assumed to be zero. The page table entry 70 also contains a 20-bit field (NextTablePtr<31:12>) that is combined with another 9 bits of the virtual address VA[20:12] to provide a pointer to the next page table entry 74 within the level 2 table. The page table entry 74 holds the upper 20 bits of the physical address [31:12] that are combined with the lowest 12 bits of the virtual address VA[11:0] to form the full physical address PA [31:0] resulting from the translation. It will be appreciated that larger virtual addresses, e.g. 48 bit virtual addresses, may need more levels of page table walk. The page table entry 66 also includes other attribute bits including a table security field 68 indicating whether or not the page table 50 pointed to by that page table entry 66 is stored within a non-secure region of the memory or a secure region of the memory. This table security field is the NSTable bit. This indicates when set that the next page table pointed to is stored within a non-secure region of the memory (and that bus accesses should be treated as non-secure)

In the example illustrated in FIG. 3, the Level 0 page table 46 points to a Level 1 page table 50 which is also stored within a secure region of the memory. The page table entry 70 includes its own table security field 72 indicating whether or not the next page table 56 pointed to by the page table entry 70 is stored within a secure region of memory or a non-secure region of memory. The page table entry 70 may also include additional attribute bits.

In this example, the page table 56 in Level 2 of the page table hierarchy for the secure page table is stored within a non-secure region of the memory. This is indicated by the table security field 72 within the page table entry 70 being set (NSTable=1), i.e. indicating that the next page table pointed to is stored within a non-secure region.

It will be noted that the table security fields (i.e. NSTable bit) relate to the next page table to be accessed within a page table walk. Thus, when moving between page tables stored in a secure region to page tables stored in a non-secure region, the table security field used to indicate this change is stored within the secure region and accordingly is protected from malicious alteration.

At each stage of the page table walk, a portion of the virtual address is used as an index value to select a page table entry to be used to translate that portion of the virtual address and to access a pointer to the next page table to be used in that translation. At least one of the page table entries 66, 70 and 74 associated with the full page table walk includes the memory attributes associated with that memory access to be used by the memory management unit 24. These may include attributes such as whether or not the translation from virtual to physical address provided by that page table walk is a global translation to be used for all processes or is a non-global translation only to be used for the process which is currently triggering that page table walk. Further attributes may include whether or not the page table concerned is read-only, cacheable, privileged only etc, as will be familiar to those in this technical field.

Figure 4:
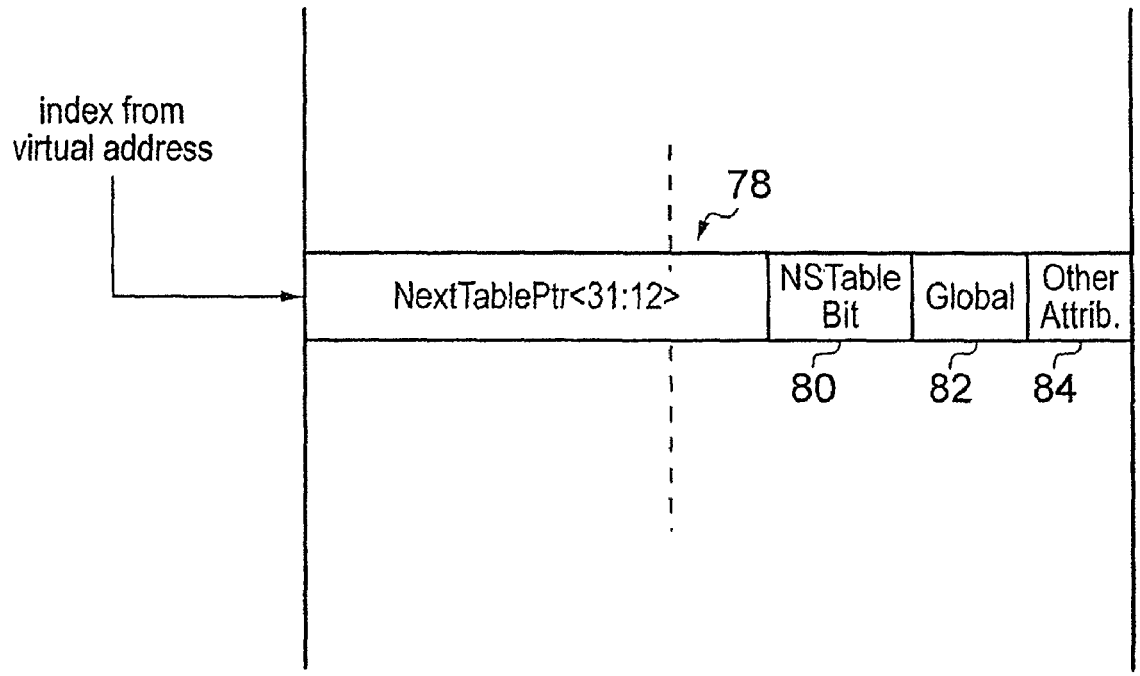
FIG. 4 schematically illustrates a page table entry including a table security field and a global/non-global attribute field.

FIG. 4 schematically illustrates a page table entry 78 within one of the page tables 46 to 52 of FIG. 3. The page table entries at level 2 may be the same with 20 bits of physical address PA[31:12] in place of the NextTablePtr<31:12> field. This page table entry 78 is located at a position within the relevant page table where it is indexed (i.e. its position within the page table identified so that it may be selected for access) using nine bits from the virtual address. The nine bits of the virtual address used as the index will depend upon which level within the page table hierarchy is associated with the page table containing the page table entry 78 as discussed. The page table entry 78 includes a table security field 80 storing a bit which indicates whether or not the page table pointed to by the NextTablePtr<31:12> field within the page table entry 78 is stored within a non-secure region of the memory or a secure region of the memory. The page table entry 78 also includes a field 82 indicating whether or not that page table entry is a global page table entry giving attribute data to be used for all processes or a non-global page table entry giving attribute data only to be used for the process which is currently triggering the page table walk. Other attributes 84 are stored within the page table entry 78, such attributes may indicate cacheability, read-only status etc.

It will be appreciated that each page table entry 78 which is followed by a lower level of page table entries within the hierarchy of page tables will include a table security field 80. The lowest level of page tables in Level 2 of the hierarchy does not point to any following page tables and accordingly need not include a table security field. The global attribute 82 and the other attributes 84 need only be provided in one of the page tables 46 to 58 traversed in a page table walk and need not be stored in every page table. It would be normal for the global attribute and the other attributes 84 to be stored at the lowest level in the hierarchy (corresponding to Level 2 in this embodiment) as this will give the finest granularity of control over how the memory attributes are to be characterised and controlled. Memory attributes at higher levels within the page table hierarchy may be used to give a coarser grained level of differentiation between the attributes of different regions of the memory.

It will be appreciated by those in this technical field that the level of granularity within the memory address space becomes smaller as the page table hierarchy is descended. Thus there will typically be an increase in the number of page tables at each level within the hierarchy. If the full memory address space is mapped to the finest level of granularity, then the volume of page table data will be large. It may be that not all of the memory address space is mapped to the full level of granularity and may be marked at higher levels in the memory as unavailable or having default memory attributes.

Figure 5:
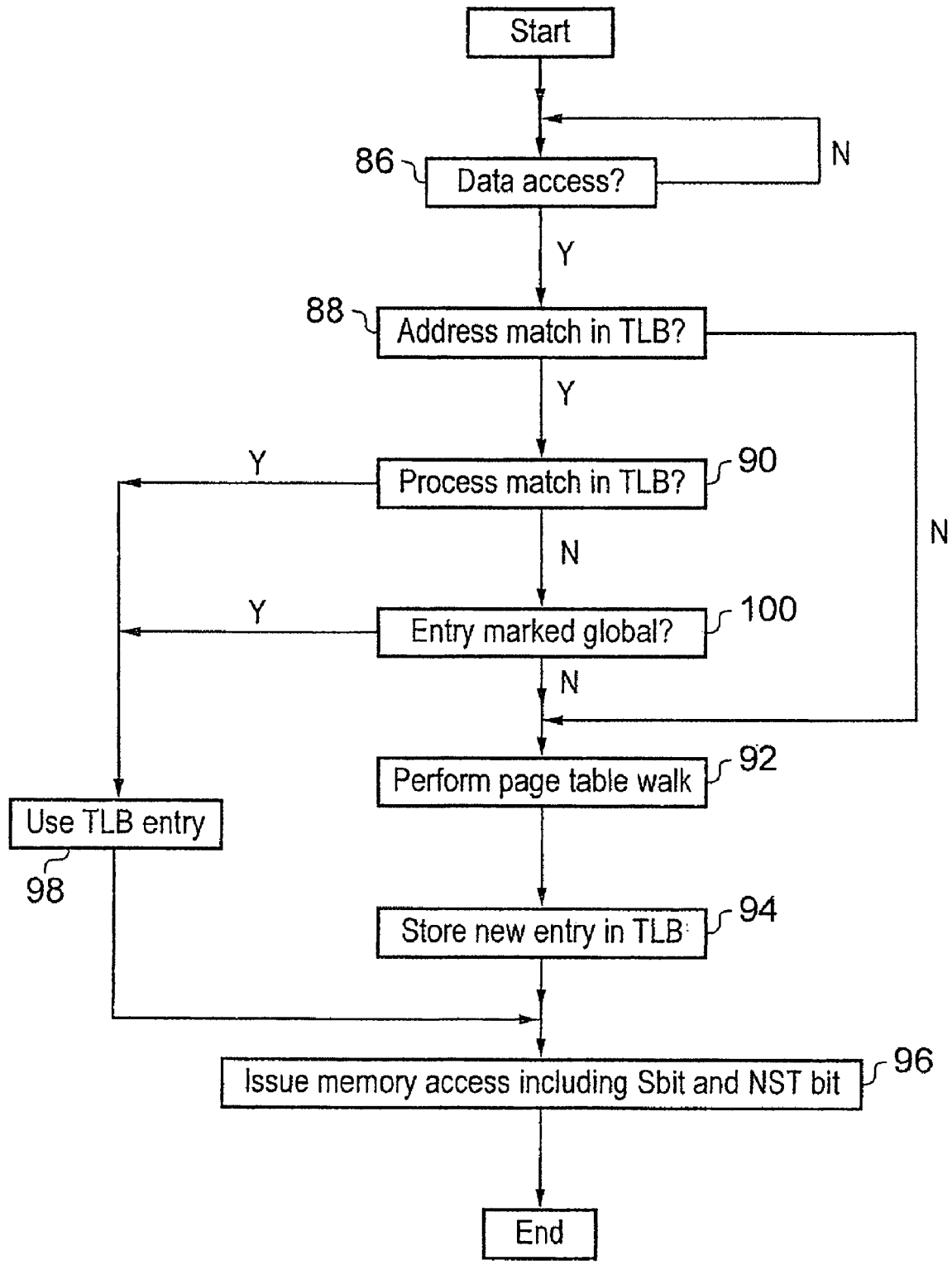
FIG. 5 is a flow diagram schematically illustrating a process for managing a memory access operation using attribute data stored within a translation lookaside buffer or accessing attribute data via a page table walk.

FIG. 5 is a flow diagram schematically illustrating processing of a memory access by the memory management unit 24 when operating in a secure mode (when operating in a secure mode memory access should be treated as secure, as indicated by a signal on the bus, at least until an NSTable value of "1" is encountered). At step 86 the memory management unit waits for a data access to occur. When a data access occurs, an access to either the secure memory 22 or the non-secure memory 6 is required. This will require a translation from the virtual address generated by the processor 8 into a physical address as used by the secure memory 22 and the non-secure memory 6. At step 88 a lookup is made in the translation lookaside buffer 30 to determine whether there is an address match in respect of the virtual address to be accessed. If the page of virtual memory being accessed has previously been accessed, then there is likelihood that the relevant translation data (memory attribute data, such as virtual to physical address translation data, cacheability status, read-only status etc) will be stored within the translation lookaside buffer 30 and if so an address match occurs. If there is an address match at step 88, then processing proceeds to step 90. It will be appreciated that there may be several address matches at step 88 corresponding to different process indentifiers (ASIDs). These can be distinguished at step 90 by their process identifier stored within the TLB 30 and the entry matching the current process (if any) will be the one for which a hit is returned. If there is no address match at step 88, then a page table walk is required and this is performed at step 92 in accordance with the methodology previously described in relation to FIGS. 3 and 4.

Following a page table walk at step 92, the new page table data (including the NST bit) is stored within the translation lookaside buffer 30 at step 94. Step 96 then issues the memory access to the secure memory 22 or the non-secure memory 6 using the physical address generated with the translation data obtained together with signals indicating that the processor 8 is currently in a secure mode of operation and whether or not the memory access has been made using page table data including at least some page table data stored within the non-secure memory 6.

If the determination at step 88 was that there was a match within the translation lookaside buffer 30 to the virtual address being accessed, then step 90 determines whether or not the process currently being executed by the processor 8 matches the process associated with each entry whose address matched in step 88 within the translation lookaside buffer 30. If there is such a match, then step 98 selects for use the translation lookaside buffer entry concerned and proceeds to step 96. If there was not a match at step 90, then processing proceeds to step 100 where a determination is made as to whether or not the translation lookaside buffer entry subject to an address match at step 88 is marked as a global entry to be used for all processes. If the entry concerned is marked as global, then processing again proceeds to step 98. If the entry is not marked as global, then processing proceeds to step 92 to perform a page table walk.

It will be appreciated that the processing illustrated in FIG. 5 is shown as a sequential process. In practice the operations of the memory management unit 24 may be performed in a different order and/or with different levels of parallelism. Nevertheless, the flow diagram of FIG. 5 illustrates one view of the overall level of processing and control performed. It will also be appreciated that parts or all of this processing could be performed in software.

Figure 6:
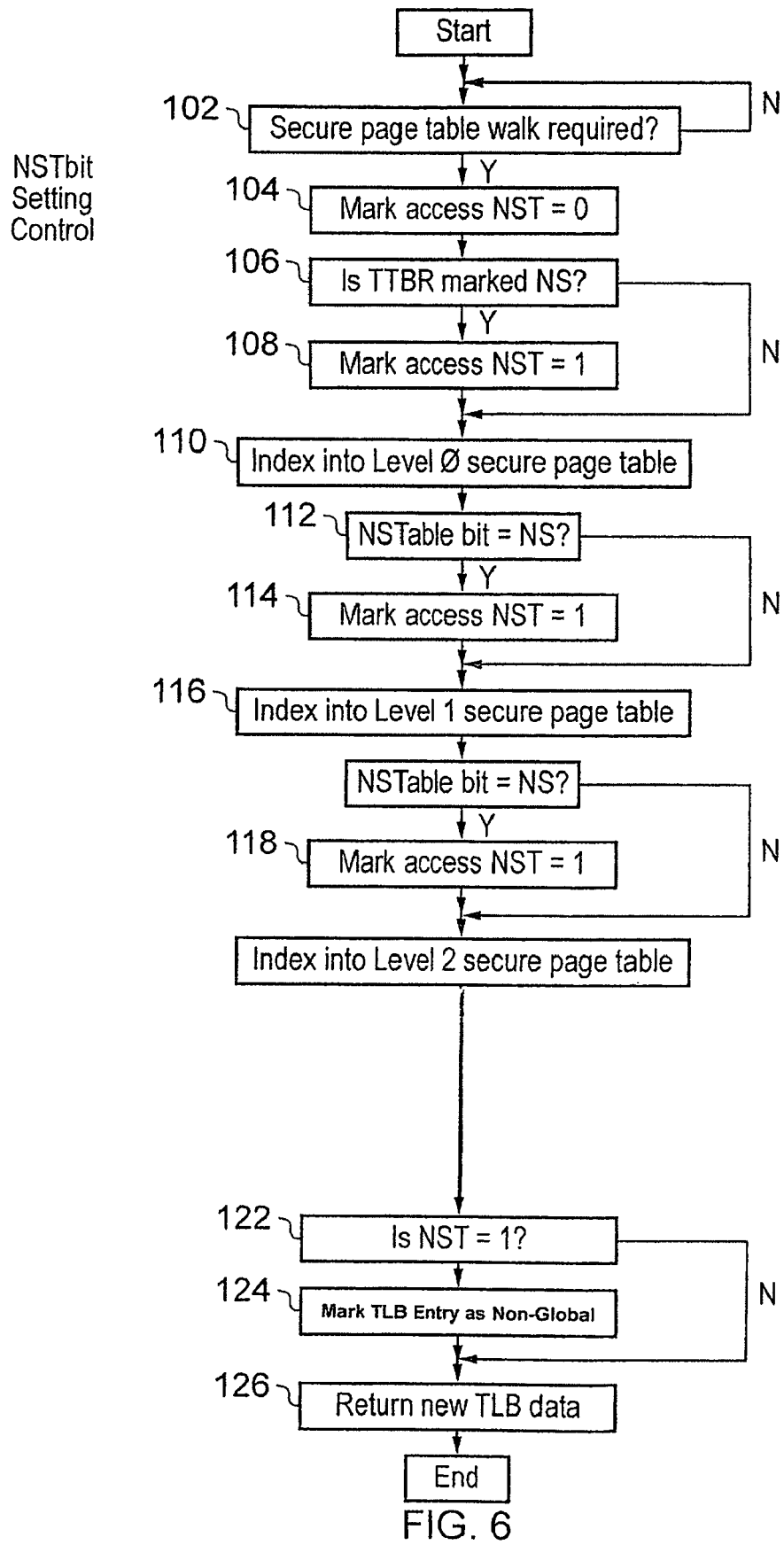
FIG. 6 is a flow diagram schematically illustrating a process performed as part of a page table walk to control recovered attribute data in response to table security field data within different page table entries accessed during the page table walk.

FIG. 6 illustrates control of the setting of the table security status (NST bit) associated with a memory access when performing a page table walk (this table security status being eventually returned to the access control circuitry 128 of FIG. 1). This table security status (NST bit) indicates whether or not any secure page tables stored in non-secure regions of memory are used during that page table walk through the secure mode page table data. At step 102 processing waits for a secure page table walk to be required. When such a walk is required, step 104 sets the initial value of the table security status to "0". Step 106 then determines whether the translation table base register storing the pointer to the Level 0 page table 46 of the secure mode page table data indicates that all of the secure mode page table data is stored within non-secure regions of the memory. The TTBR 32 provides a bit specific to this purpose. If the determination at step 106 is that all of the secure mode page table data is stored in the non-secure memory, then step 108 sets the NST bit to "1", i.e. the access should be treated as non-secure by the processor. If the determination at step 106 is that all of the secure mode page table data is not stored within the non-secure regions of the memory, then step 108 is bypassed.

At step 110 a portion of the virtual address associated with the memory access being performed is used to index into the page table 46 at Level 0, which is stored within the secure memory 22. The page table entry 66 at this level is then read and step 112 determines whether the table security field 68 indicates that the Level 1 page table 50 pointed to by the page table entry 66 is stored within non-secure memory. If the page table 50 were indicated as being stored within non-secure memory 6, then step 114 would set the table security status NST to "1" at step 114. If the table security field 68 read at step 112 is not set, then step 114 is bypassed and processing proceeds to step 116 where checking of the table security field within the next level of the hierarchy (i.e. Level 1) is performed and the table security status is set to "1" if the table security field 72 within the page table entry 70 indicates that the next page table 56 is stored within non-secure memory. As in this example Level 2 is the lowest in the hierarchy it does not need a table security field relating to a lower level.

If any of the page tables 46, 50 or 56 accessed during the page table walk were stored within non-secure memory, then the table security status NST associated with the memory access will have been changed from its initial starting value of "0" set at step 104 into a value of "1" as set in any one of steps 108, 114 or 118. The setting of the NST bit is determined by the memory management unit 24 during its page table walk performed under hardware control and is accordingly a secure determination.

Step 122 determines whether or not the table security status NST equals "1". If the table attribute bit NST does equal "1", then step 124 forces the TLB entry to be marked as non-global such that the returned attribute data to be stored within the translation lookaside buffer 30 will only be used for the current process irrespective of how that attribute data is marked within the secure mode page table data itself. At step 126 the memory attribute data and an NST bit and an Sbit (indicating whether the system is in a secure mode) is returned to the translation lookaside buffer 30 and is also used to form and control the memory access to one of the secure memory 22 or the non-secure memory 6.

Figure 7:
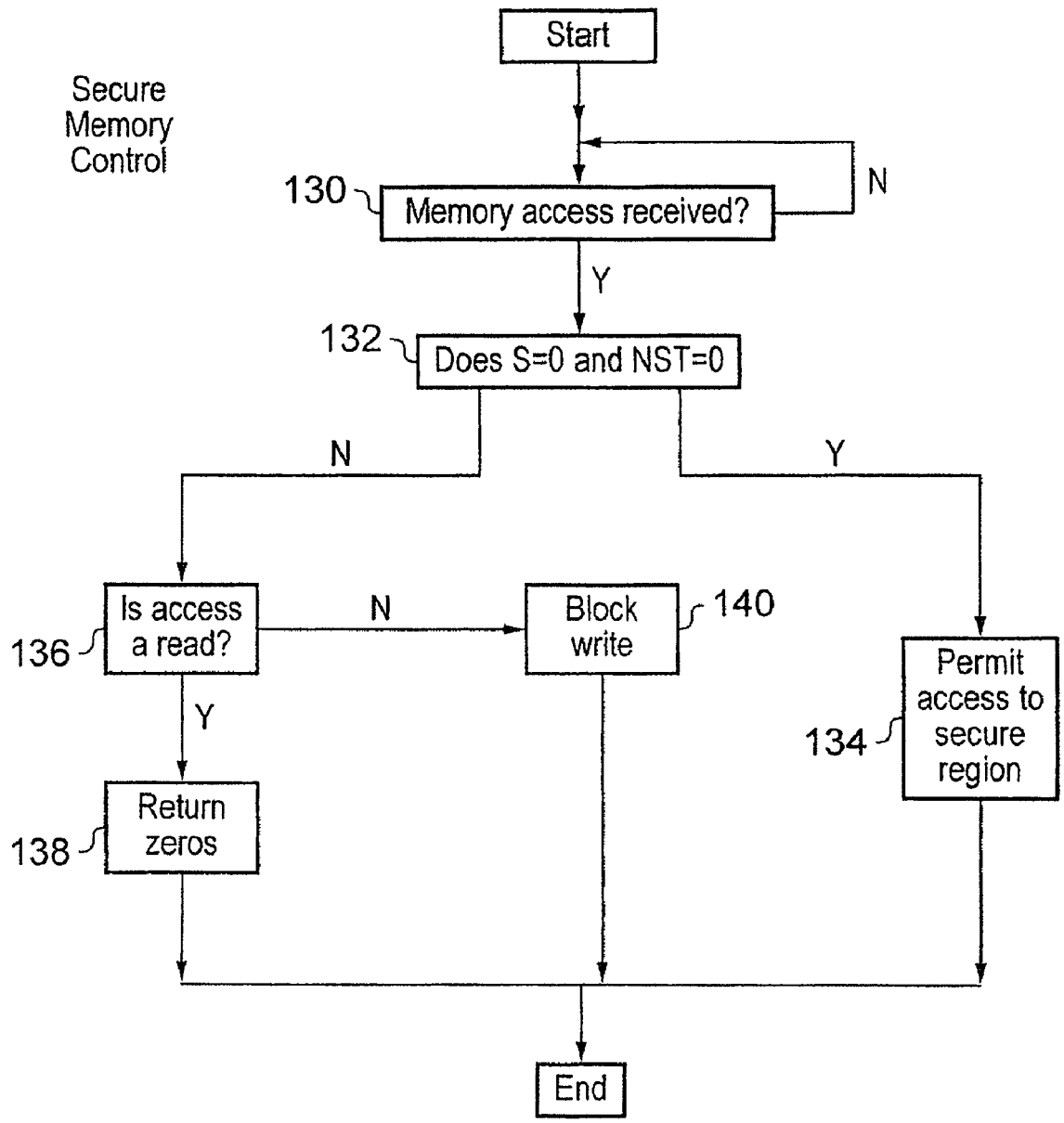
FIG. 7 is a flow diagram schematically illustrating operation of a secure memory circuit responsive to a memory access request to either permit or block that memory access request dependant upon a table attribute and a security mode attribute associated with the memory access request.

FIG. 7 is a flow diagram illustrating the processing associated with the secure memory 22 as performed by access control circuitry 128 associated with the secure memory 22. At step 130 the access control circuitry 128 receives a memory access request. Step 132 determines whether or not the memory access request is accompanied by a signal S indicating that the processor 8 originating that memory access request is operating in one of the secure modes 40. The memory access request is also associated with the table attribute bit NST indicating whether or not any of the page tables used in generating that memory access request are stored within the non-secure regions of the memory. The determination at step 132 ensures that the access control circuitry 128 will only pass and permit a memory access to the secure memory 22 at step 134 if the S bit indicates that the processor 8 is in a secure mode (i.e. S equals 0) and that the table attribute bit is "0" indicating that no non-secure mode page table data has been used in generating that memory access request. Access may also be further gated upon, for example, privilege level in accordance with the standard techniques. If a memory access request fails these combined tests, then processing proceeds to step 136. Step 136 determines whether or not the access is a read. If the access is a read, then step 138 returns all 0 values for that read (an alternative would be to trigger an exception such that the operating system could handle an appropriate response. If the access is not a read, then step 140 blocks the write operation.

Returning to FIG. 1, it will be seen that a first part of the secure mode page table data 36 is stored within the secure memory 22. A second part of the secure mode page table data 38 is stored within the non-secure memory 6. The non-secure memory 6 is provided in a separate integrated circuit and has a larger storage capacity than the secure memory 22. The first part of the secure mode page table data 36 may be page table data relating to pages which are also stored within the secure memory 22 and contain sensitive data whereas the second portion of the secure mode page table data 38 can relate to pages which are stored in the non-secure memory 6 and contain non-sensitive data. Limited storage space within the secure memory 22 is not consumed storing the second portion of the secure mode page table data 38 which is instead able to be stored within the non-secure memory 6. The marking of the secure mode page table data to indicate whether portions of it are stored within the non-secure memory 6 permits control to be exercised such that a memory access can be associated with a table attribute bit NST which indicates whether or not any page table data associated with that memory access is stored within the non-secure memory 6 despite forming part of the secure mode page table data. In this way, the first portion of the secure mode page table data 36 can be securely held within the secure memory 22 where it may be protected from malicious alteration and the table attribute bit NST may be generated under hardware control so that it indicates the involvement of page table data stored within the non-secure memory 6 in a manner which may be detected by the memory management unit 24 by reference solely to the first portion of the secure mode page table data 36 and which cannot be altered by malicious alteration of the second portion of the secure mode page table data 38.

It will be appreciated that the above described techniques permit the use of legacy software which need not be aware of the presence or manipulation of the NSTable bit and associated mechanisms. It also allows reuse of portions of page table data, for example non-secure memory mapped peripherals or non-secure shared library code.

Figure 8:
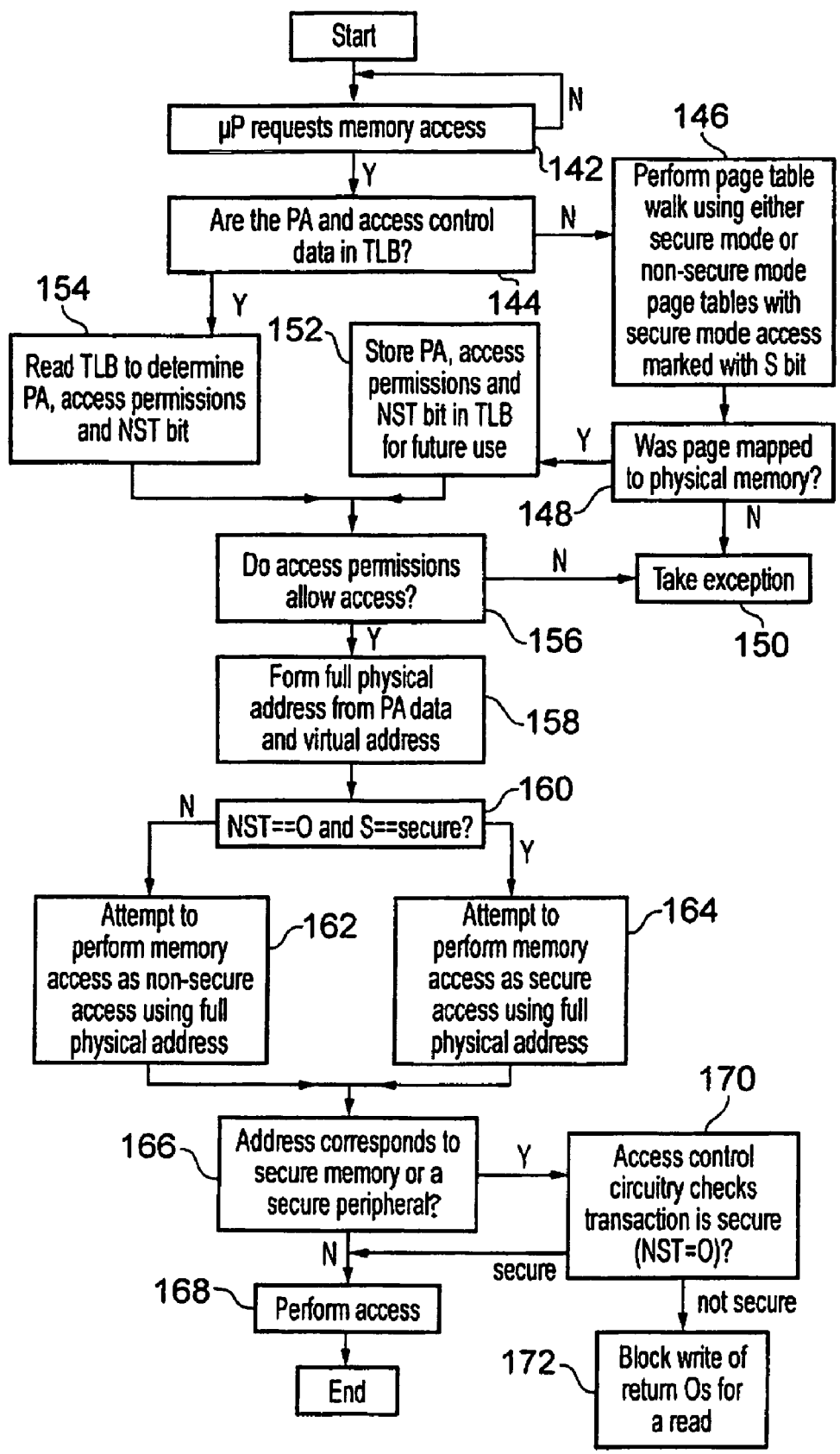
FIG. 8 is a flow diagram schematically illustrating some of the processing associated with a memory access request.

FIG. 8 is a flow diagram schematically illustrating some of the processing associated with a memory access request. At step 142 processing waits until a memory access request is received. Such memory access requests may be the result of load instructions, store instructions, instruction fetch operations or the like. The memory access may be to a portion of memory stored within a random access memory, a read only memory or the like or may be to a memory mapped peripheral within the memory address space. These alternatives will be familiar to those in this technical field. When a memory access request is received at step 142, processing proceeds to step 144 where a look up is made in the translation lookaside buffer 30 to determine whether there is an entry within the translation lookaside buffer 30 corresponding to the virtual address associated with the memory access request. It will be appreciated that the translation lookaside buffer 30 may correspond to a translation lookaside buffer hierarchy, such as including a micro-translation lookaside buffer for rapid access to the most recently used translations and a larger translation lookaside buffer with a greater number of less recently used translation data stored therein. It will be appreciated that the translation lookaside buffer stores more data than just the data permitting a translation from a virtual address to a physical address, such as storing the permissions data, the NST bit data, secure mode data, process identifiers (ASIDs), data indicating whether the translation is global or non-global and the like. The match performed when determining whether the virtual address has corresponding data within the translation lookaside buffer may not only consider bits of the virtual address but may also match the secure bit S indicating whether or not the memory request originates from a secure mode or a non-secure mode. The NST bit for the entry within the translation lookaside buffer may also be read and if this is set then, for example, an entry marked as global may be downgraded to non-global (i.e. only applies to a single process with the matching process identified).

If the determination at step 144 is that the translation lookaside buffer does not contain a matching entry, then processing proceeds to step 146 where a page table walk in the relevant one of the secure mode page table data or the non-secure mode page table data is performed. This page table walk may be as previously described in relation to FIGS. 3, 5 and 6. If the microprocessor is in the secure, mode then the page table walk accesses will be marked as secure at least until an NSTable=1 value is seen. At step 148 a determination is made as to whether or not the page was successfully mapped to physical memory. If there was not a successful mapping, then processing proceeds to step 150 where exception processing is triggered. If the mapping was successful, then processing proceeds to step 152 where the physical address translation data, the NST bit and other access permission bits are stored within the translation lookaside buffer for future use.

If a determination at step 144 is that there is a match in the translation lookaside buffer, then processing proceeds to step 154 where the matching data is read from the translation lookaside buffer. This matching data includes the physical address translation data, the access permissions and the NST bit. Following both steps 152 and 154, processing proceeds to step 156 where a determination is made as to whether or not the access permission data retrieved indicates that the memory access is allowed. For example, a portion of the memory may be marked as accessible only when operating in a privileged mode and the processor may currently be in a user mode and accordingly the access should not be permitted. If the access is not allowed by the access permissions recovered, then processing proceeds to step 150 where an exception is again triggered. If the access permissions indicate that the access should be permitted, then processing proceeds to step 158 where the physical address is formed using the physical address translation data and the original virtual address of the memory access. Step 160 determines whether the NST bit is set to 0 and the secure bit S is indicating that the memory access is originating from a process executing in a secure mode. If these conditions are not both met, then processing proceeds to step 162 where the memory access is attempted to be performed as a non-secure access using the full physical address. If the conditions of step 160 are both met, then processing proceeds to step 164 where there is an attempt to perform the memory access as a secure access using the full physical address. Following both steps 162 and 164, step 166 determines whether or not the physical address corresponds to a region of secure memory or a secure peripheral. If the physical address does not correspond to secure memory or a secure peripheral, then processing proceeds to step 168 where the memory access, whether a read or a write, is performed. If the determination at step 166 is that the address corresponds to a region of secure memory or a secure peripheral, then step 170 determines using the access control circuitry 128 whether the transaction is secure in the sense that the NST bit has a value of zero. If the transaction is secure, then processing again proceeds to step 168 where the access is performed. If the transaction is not secure, then processing proceeds to step 172 where if the access is a write is blocked or if the access is a read then zero values are returned.

Figure 9:
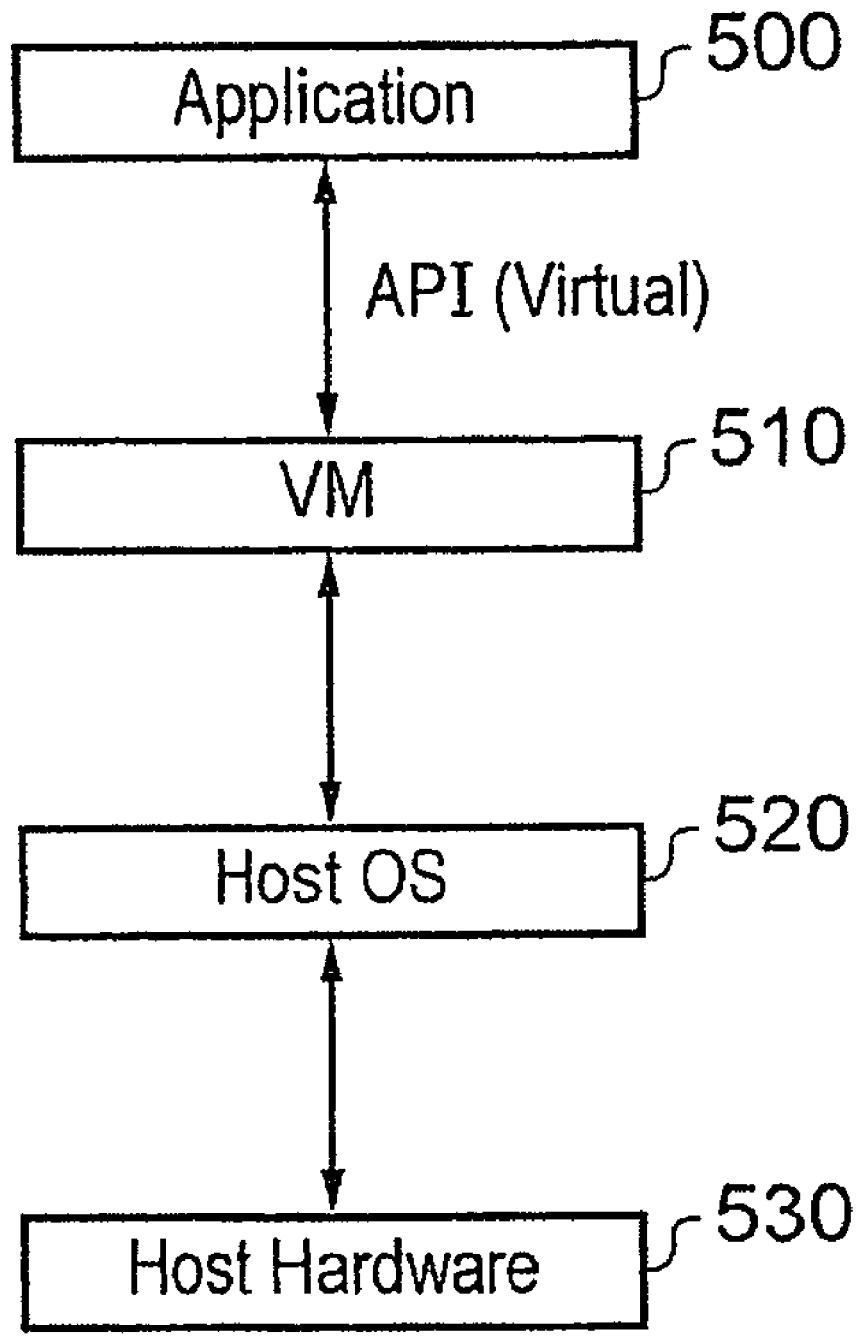
FIG. 9 schematically illustrates a virtual machine implementation.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 is capable of executing an application program (or operating system) 500 to give the same results as would be given by execution of the program by such a real hardware device. Thus, the program instructions, including the control of memory accesses described above, may be executed from within the application program 500 using the virtual machine program 510.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   a memory;
   processing circuitry responsive to program instructions to perform processing operations, said processing circuitry having a plurality of modes of operation including one or more secure modes and one or more non-secure modes, said memory including:
   (i) one or more secure regions accessible in said one or more secure modes and inaccessible in said one or more non-secure modes; and
   (ii) one or more non-secure regions accessible in said one or more secure modes and accessible in said one or more non-secure modes;
   memory control circuitry responsive to page table data to manage access to said memory; wherein
   said page table data includes secure mode page table data used to manage access to said memory when said processing circuitry is operating in said one or more secure modes and non-secure mode page table data used to manage access to said memory when said processing circuitry is operating in said one or more non-secure modes;
   said secure mode page table data includes a hierarchy of page tables with associated page table levels configured such that a first-level page table at a first page table level contains page table entries pointing to respective second-level page tables at a second page table level lower in said hierarchy than said first page table level; and
   each page table entry of said first-level page table includes a table security field indicating whether a second-level page table pointed to by said page table entry is stored within said one or more secure regions or within said one or more non-secure regions, wherein said page table data provides attribute data associated with a memory address subject to a memory access operation, said processing circuitry is configured to execute a plurality of software processes and said attribute data for said memory address is either global attribute data for use for memory accesses from any of said plurality of software processes or non-global attribute data for use for memory accesses from an individual software process and said memory control circuitry is configured to perform a page table walk operation in which a sequence of page table entries descending through said page table levels in said hierarchy are accessed to retrieve attribute data of a memory access operation to be managed and, if any of said sequence of page table entries has a value of said table security field indicating one of said sequence of page table entries is stored within said one or more non-secure regions, then said memory control circuitry is configured to treat said attribute data as if it were non-global attribute data.

2. Apparatus as claimed in claim 1, wherein said memory control circuitry is configured to perform a page table walk operation in which a sequence of page table entries descending through said page table levels in said hierarchy are accessed to retrieve attribute data of a memory access operation to be managed and, if any of said sequence of page table entries has a value of said table security field indicating one of said sequence of page table entries is stored within said one or more non-secure regions, then said memory control circuitry identifies said memory access operation as a non-secure memory access operation.

3. Apparatus as claimed in claim 2, wherein said memory control circuitry identifies said memory access operation as a non-secure memory access operation by including a non-secure table attribute within said attribute data retrieved for said memory access operation.

4. Apparatus as claimed in claim 2, wherein if said memory access operation is identified as a non-secure memory access operation by said memory control circuitry and said memory access operation is to said one or more secure regions, then said memory blocks said memory access operation.

5. Apparatus as claimed in claim 1, wherein said page table data provides attribute data associated with a memory address subject to a memory access operation, said attribute data providing a mapping between a virtual memory address of said memory access operation and a physical memory address within said memory.

6. Apparatus as claimed in claim 1, wherein a storage capacity of said one or more secure regions is less than a storage capacity of said one or more non-secure regions.

7. Apparatus as claimed in claim 1, wherein at least some of said one or more non-secure regions are formed within a first integrated circuit and said processing circuitry, said memory control circuitry and said one or more secure regions are formed within a second integrated circuit separate from said first integrated circuit.

8. Apparatus as claimed in claim 1, comprising a secure translation table base register configured to store a base address value pointing to an entry point of said hierarchy of said secure mode page table data and said secure translation table base register is configured to store a security field indicating whether all of said secure mode page table data is stored in said one or more non-secure regions.

9. Apparatus for processing data, said apparatus comprising:
memory means for storing data;
processing means for performing processing operations in response to a stream of program instructions, said processing means having a plurality of modes of operation including one or more secure modes and one or more non-secure modes, said memory means including:
(i) one or more secure regions accessible in said one or more secure modes and inaccessible in said one or more non-secure modes; and
(ii) one or more non-secure regions accessible in said one or more secure modes and accessible in said one or more non-secure modes;
memory control means for managing access to said memory means in response to page table data; wherein
said page table data includes secure mode page table data used to manage access to said memory means when said processing means is operating in said one or more secure modes and non-secure mode page table data used to manage access to said memory means when said processing means is operating in said one or more non-secure modes;
said secure mode page table data includes a hierarchy of page tables with associated page table levels configured such that a first-level page table at a first page table level contains page table entries pointing to respective second-level page tables at a second page table level lower in said hierarchy than said first page table level; and
each page table entry of said first-level page table includes a table security field indicating whether a second-level page table pointed to by said page table entry is stored within said one or more secure regions or within said one or more non-secure regions, wherein said page table data provides attribute data associated with a memory address subject to a memory access operation, said processing means is configured to execute a plurality of software processes and said attribute data for said memory address is either global attribute data for use for memory accesses from any of said plurality of software processes or non-global attribute data for use for memory accesses from an individual software process and said memory control means is configured to perform a page table walk operation in which a sequence of page table entries descending through said page table levels in said hierarchy are accessed to retrieve attribute data of a memory access operation to be managed and, if any of said sequence of page table entries has a value of said table security field indicating one of said sequence of page table entries is stored within said one or more non-secure regions, then said memory control means is configured to treat said attribute data as if it were non-global attribute data.

10. A method of managing access to a memory associated with
processing circuitry having a plurality of modes of operation including one or more secure modes and one or more non-secure modes, said memory including one or more secure regions accessible in said one or more secure modes and inaccessible in said one or more non-secure modes and one or more non-secure regions accessible in said one or more secure modes and accessible in said one or more non-secure modes, said method comprising the steps of:
in response to secure mode page table data, managing access to said memory when said processing circuitry is operating in said one or more secure modes; and
in response to non-secure mode page table data, managing access to said memory when said processing circuitry is operating in said one or more non-secure modes; wherein
said secure mode page table data includes a hierarchy of page tables with associated page table levels configured such that a first-level page table at a first page table level contains page table entries pointing to respective second-level page tables at a second page table level lower in said hierarchy than said first page table level; and each page table entry of said first-level page table includes a table security field indicating whether a second-level page table pointed to by said page table entry is stored within said one or more secure regions or within said one or more non-secure regions, wherein said page table data provides attribute data associated with a memory address subject to a memory access operation, said processing circuitry executes a plurality of software processes and said attribute data for said memory address is either global attribute data for use for memory accesses from any of said plurality of software processes or non-global attribute data for use for memory accesses from an individual software process and performing a page table walk operation in which a sequence of page table entries descending through said page table levels in said hierarchy are accessed to retrieve attribute data of a memory access operation to be managed and, if any of said sequence of page table entries has a value of said table security field indicating one of said sequence of page table entries is stored within said one or more non-secure regions, then treating said attribute data as if it were non-global attribute data.

11. A method as claimed in claim 10, comprising performing a page table walk operation in which a sequence of page table entries descending through said page table levels in said hierarchy are accessed to retrieve attribute data of a memory access operation to be managed and, if any of said sequence of page table entries has a value of said table security field indicating one of said sequence of page table entries is stored within said one or more non-secure regions, then identifying said memory access operation as a non-secure memory access operation.

12. A method as claimed in claim 11, comprising identifying said memory access operation as a non-secure memory access operation by including a non-secure table attribute within said attribute data retrieved for said memory access operation.

13. A method as claimed in claim 11, wherein if said memory access operation is identified as a non-secure memory access operation and said memory access operation is to said one or more secure regions, then said memory blocks said memory access operation.

14. A method as claimed in claim 10, wherein said page table data provides attribute data associated with a memory address subject to a memory access operation, said attribute data providing a mapping between a virtual memory address of said memory access operation and a physical memory address within said memory.

15. A method as claimed in claim 10, wherein a storage capacity of said one or more secure regions is less than a storage capacity of said one or more non-secure regions.

16. A method as claimed in claim 10, wherein at least some of said one or more non-secure regions are formed within a first integrated circuit and said processing circuitry and said one or more secure regions are formed within a second integrated circuit separate from said first integrated circuit.

17. A method as claimed in claim 10, wherein a secure translation table base register stores a base address value pointing to an entry point of said hierarchy of said secure mode page table data and said secure translation table base register stores a security field indicating whether all of said secure mode page table data is stored in said one or more non-secure regions.

18. A virtual machine provided by a computer program stored on a non-transitory storage medium executing upon a data processing apparatus, said virtual machine providing an instruction execution environment according to a apparatus for processing data as claimed in claim 1.

19. Apparatus for processing data, said apparatus comprising:
 a memory;
 processing circuitry responsive to program instructions to perform processing operations, said processing circuitry having a plurality of modes of operation including one or more secure modes and one or more non-secure modes, said memory including:
 (i) one or more secure regions accessible in said one or more secure modes and inaccessible in said one or more non-secure modes; and
 (ii) one or more non-secure regions accessible in said one or more secure modes and accessible in said one or more non-secure modes;
 memory control circuitry responsive to page table data to manage access to said memory; wherein
 said memory control circuitry is configured such that when operating in one of said one or more secure modes and said memory control circuitry receives a signal indicating that page table data stored within said one or more non-secure regions has been used to manage access for a memory access request operating in one of said one or more secure modes, then said memory control circuitry handles said memory access as if said memory access had arisen when operating in one of said one or more non-secure modes, wherein said page table data provides attribute data associated with a memory address subject to a memory access operation, said processing circuitry is configured to execute a plurality of software processes and said attribute data for said memory address is either global attribute data for use for memory accesses from any of said plurality of software processes or non-global attribute data for use for memory accesses from an individual software process and said memory control circuitry is configured to perform a page table walk operation in which a sequence of page table entries descending through said page table levels in said hierarchy are accessed to retrieve attribute data of a memory access operation to be managed and, if any of said sequence of page table entries has a value of said table security field indicating one of said sequence of page table entries is stored within said one or more non-secure regions, then said memory control circuitry is configured to treat said attribute data as if it were non-global attribute data.

* * * * *